United States Patent
Lefebvre

(12) 
(10) Patent No.: US 6,575,441 B2
(45) Date of Patent: Jun. 10, 2003

(54) RESILIENT JOINT WITH VARIABLE RADIAL RIGIDITY

(75) Inventor: Serge Lefebvre, Clermont-Ferrand (FR)

(73) Assignee: Michelin Recherche et Technique S.A., Granges-Paccot (CH)

(*) Notice: Subject to any disclaimer, the term of this patent is extended or adjusted under 35 U.S.C. 154(b) by 0 days.

(21) Appl. No.: 10/109,402

(22) Filed: Mar. 28, 2002

(65) Prior Publication Data

US 2002/0149146 A1 Oct. 17, 2002

Related U.S. Application Data

(63) Continuation of application No. PCT/FR01/02467, filed on Jul. 27, 2001.

(30) Foreign Application Priority Data

Jul. 28, 2000 (FR) .............................................. 00 09905

(51) Int. Cl.[7] .............................................. B60G 11/22
(52) U.S. Cl. ........................ 267/281; 267/279; 267/293; 267/141
(58) Field of Search ................................ 267/273, 279, 267/280, 281, 282, 292, 293, 294, 153, 141; 280/124.13, 124.166, 124.177

(56) References Cited

U.S. PATENT DOCUMENTS

| 2,915,306 A | * | 12/1959 | Hickman | 267/281 |
| 3,467,421 A | * | 9/1969 | Bentley | 267/279 |
| 4,984,928 A | * | 1/1991 | Domer | 403/228 |
| 5,338,012 A | * | 8/1994 | Kranick | 267/292 |
| 6,074,016 A | | 6/2000 | Blondelet et al. | 301/127 |
| 6,145,858 A | | 11/2000 | Foulquier | 280/124.13 |

FOREIGN PATENT DOCUMENTS

| EP | 0956984 | 11/1999 |
| FR | 2661719 | 11/1991 |
| FR | 2 739 153 A1 * | 3/1998 |
| GB | 2332728 | 6/1999 |
| WO | 9747486 | 12/1997 |

* cited by examiner

*Primary Examiner*—Jack Lavinder
*Assistant Examiner*—Thomas J. Williams
(74) *Attorney, Agent, or Firm*—Baker Botts L.L.P.

(57) ABSTRACT

The disclosure concerns an elastic articulation designed to operate in torsion and comprising an elastomeric sleeve (7) whereof the inner and outer peripheral surfaces are linked without any possibility of sliding respectively to inner (8) and outer (9) reinforcements, and which is configured such that the articulation should have a minimal radial rigidity along a first reference axis Z' of a system with three reference axes X', Y, Z' whereof the second reference axis Y merges with the axis of the elastic articulation (5), at least one of the two end surfaces (7a) and (7b) of the sleeve (7) has a profile which continuously moves in the circumferential direction of the sleeve between at least a minimum and at least a maximum, the minimum or minima and the maximum or maximums of the profile in the inner peripheral zone of the end surface being offset by a predefined angle respectively relative to the minimum or minima or to the maximum or maximums of the profile in the outer peripheral zone of the end surface.

9 Claims, 4 Drawing Sheets

RESILIENT JOINT WITH VARIABLE RADIAL RIGIDITY

CROSS REFERENCE TO RELATED APPLICATIONS

This application is a continuation of international application Serial No. PCT/FR01/02467, filed Jul. 27, 2001 and published as WO 02/09959 in French on Feb. 7, 2002, which further claims priority to French application Serial No. FR 00109905 filed Jul. 28, 2000.

INTRODUCTION

The present invention relates in general to elastic articulations also known as resilient joints. It is applicable notably, but not exclusively, to a vehicle suspension, in particular to a suspension for an axle of the type comprising two suspension arms, one end of which supports an axle arm receiving a wheel and the other end of which is integral with a shaft that is mounted in articulated fashion on the vehicle body through the intermediary of a resilient joint capable of operating in torsion and in compression/traction at the same time to provide the functions of spring suspension and filtration of vibrations or shocks.

The present invention relates in particular to a resilient joint with variable radial rigidity, the radial rigidity of which has a minimal value along a first reference axis of a system with three reference axes, the second reference axis of which merges with the axis of rotation of the resilient joint. Here "radial rigidity" means the rigidity of the joint in any direction perpendicular to the axis of rotation of the joint. Usually, in the case of a resilient joint for vehicle suspension, the above-mentioned "first reference axis" is oriented perpendicular or approximately perpendicular to a horizontal plane of reference linked to the vehicle body. Here "horizontal plane of reference linked to the body" means a plane that shifts parallel to the ground during travel of the vehicle under normal conditions.

BACKGROUND OF THE INVENTION

Resilient joints with variable radial rigidity are already well known, notably through applicant's European Patent EP 0,956,984. The resilient joint described in the said document comprises a cylindrical inner reinforcement, an outer reinforcement surrounding the inner reinforcement concentrically, and a sleeve made of elastomeric material, which is arranged between the inner and outer reinforcements and the inner and outer peripheral surfaces of which are linked without any possibility of sliding to the said inner and outer reinforcements. The elastomeric sleeve has at least one cavity, preferably two diametrically opposite cavities, which are positioned in such a way that the joint presents minimal radial rigidity along the above-mentioned first reference axis. Each cavity opens into at least one of the end surfaces of the sleeve, preferably into its two end surfaces, that is, in the first case, each cavity traverses the sleeve from one side to the other in a direction parallel to the axis of the joint. Each cavity additionally has a curved shape in the circumferential direction of the sleeve. The fatigue resistance of such a known resilient joint is hard to guarantee under all conditions of use.

In addition, with the resilient joint described in European Patent EP 0,956,984, it is relatively difficult to refine the direction in which the joint presents its minimal radial rigidity, in particular when the elastomeric sleeve operates in torsion, as is the case in a resilient joint with a suspension spring function. This difficulty may be thought to be due to the deformation in torsion of the elastomeric sleeve, which deformation modifies the geometry of the sleeve when the resilient joint bears the rated load for which it is designed.

Therefore, the object of the present invention is to furnish a resilient joint with variable radial rigidity, capable of operating in compression/traction and in torsion, and presenting improved fatigue resistance under compression/traction stresses as well as under torsional stresses.

The object of the present invention likewise is to furnish a resilient joint with variable radial rigidity, of which the direction in which radial rigidity is minimal may be greatly refined.

SUMMARY OF THE INVENTION

The present invention furnishes a resilient joint with variable radial rigidity designed to be mounted so as to operate in compression/traction and in torsion at the same time, in particular for a vehicle suspension, comprising an inner reinforcement, an outer reinforcement surrounding the inner reinforcement, and a sleeve made of elastomeric material, which is arranged between the inner and outer reinforcements and the inner and outer peripheral surfaces of which are linked without any possibility of sliding to the said inner and outer reinforcements, the said sleeve being configured such that the joint has a minimal radial rigidity along a first reference axis of a system with three reference axes, whose second reference axis merges with the axis of rotation of the resilient joint, characterized in that at least one of the two end surfaces of the sleeve has a profile that moves continuously in the circumferential direction of the sleeve between at least a minimum and at least a maximum, and in that the profile, in the inner peripheral zone of the said end surface, has at least a minimum and at least a maximum which are offset by a predefined angle respectively relative to at least a minimum and at least a maximum of the profile in the outer peripheral zone of the said end surface when no load is applied to the joint.

The said predefined angle preferably is selected in such a way that, when the joint is subjected to a reference load producing relative rotation of the said predefined angle of the inner and outer reinforcements relative to one another, the geometric loci of the minima and the geometric loci of the maximums of the profile between the said inner and outer peripheral zones are oriented approximately radially respectively along the first reference axis and along the third reference axis of the system with three reference axes.

Preferably, in each of the said inner and outer peripheral zones and in the intermediate zones, the said profile has two minima and two maximums along the circumference of the sleeve made of elastomeric material.

Preferably, the two end surfaces of the sleeve have a wavy profile. The wavy profile has for example an approximately sinusoidal or pseudo-sinusoidal shape.

Preferably, the first reference axis is approximately perpendicular to a horizontal plane linked to the vehicle body.

In one embodiment of the invention, the outer reinforcement is made up of a cylindrical collar or sleeve that is fixed rigidly in a predefined angular position in a bore of a supporting piece designed to be fixed to the vehicle body.

The supporting piece may be made up of a side rail, which has at least one supporting surface, preferably two supporting surfaces, capable of cooperating with at least one corresponding supporting surface on the vehicle body, so that, after fixation of the rail to the said body, the three reference axes of the resilient joint have predefined orientations relative to a system of reference axes linked to the vehicle body.

BRIEF DESCRIPTION OF THE DRAWING

Other characteristics and advantages of the invention will appear in the following description of an embodiment of the invention given by way of example with reference to the accompanying drawing, wherein.

DETAILED DESCRIPTION OF THE INVENTION

Figure 1:
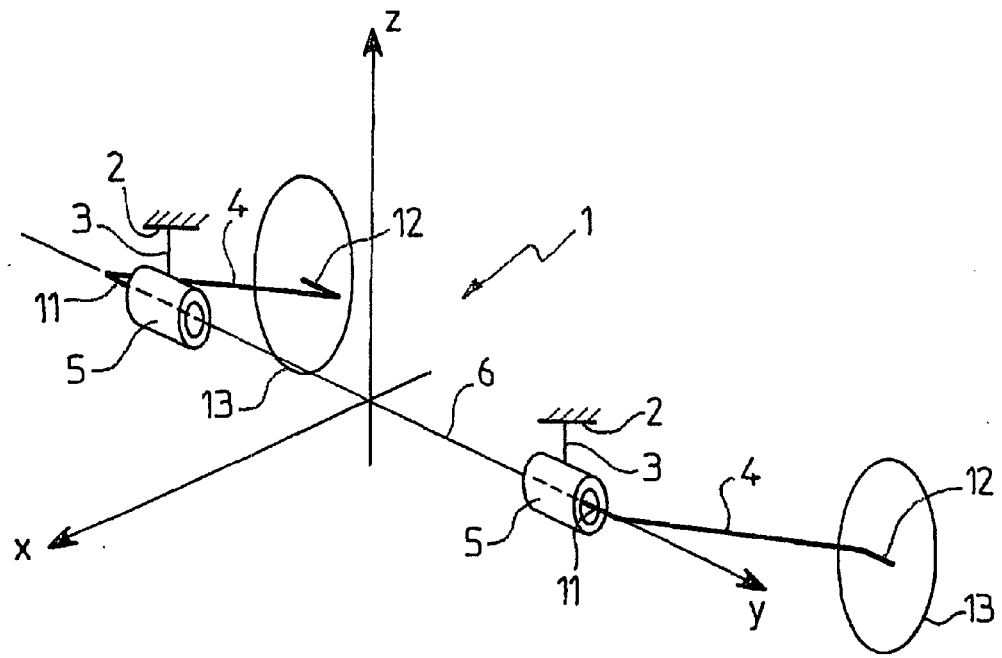
FIG. 1 represents, very schematically, a vehicle axle incorporating two joints with variable radial rigidity according to the invention.

Referring to FIG. 1, one can see an axle 1, more precisely a rear axle, designed for mounting on the body 2 of a vehicle through the intermediary of supports 3, an advantageous embodiment of which will be described in detail below. In FIG. 1, there is also represented a system with three reference axes X, Y and Z linked to the vehicle body. The X axis is the longitudinal median axis of the vehicle, the Y axis is a transverse axis, which with the X axis defines the horizontal plane of reference mentioned above, and the Z axis is vertical.

The axle 1 comprises essentially two drawn suspension arms 4 which are connected to the supports 3 by resilient joints 5 capable of operating in compression/traction and in torsion in such a way that the two suspension arms 4 can have, one independently of the other, a limited angular clearance relative to the vehicle body 2 about the axis 6 of the joints 5, which merges with the Y axis.

Figure 2:
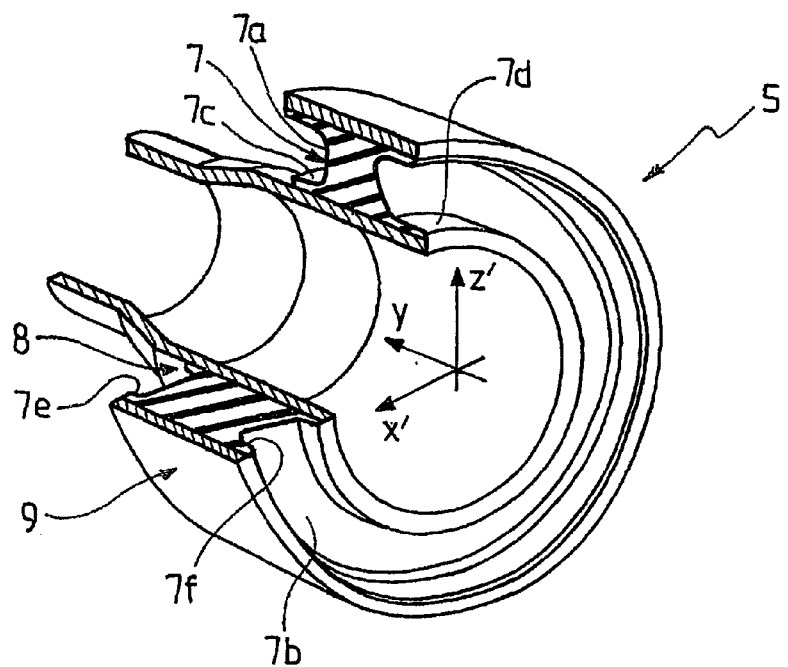
FIG. 2 is a sectional perspective view of one of the two resilient joints incorporated in the axle of FIG. 1.

In FIG. 2, there is represented one of the two joints 5, which are similar (in general, symmetrical). As shown in FIG. 2, the joint 5 is made up essentially of a sleeve 7 made of an elastomeric material, which is arranged between an inner cylindrical reinforcement 8 and an outer cylindrical reinforcement 9 and which is rigidly fixed to these two reinforcements without any possibility of sliding, for example by the known technique of adhesion.

Each resilient joint 5, as will be seen below, has a variable radial rigidity, that is, a radial rigidity having a minimal value along a first reference axis which is to be oriented along a first preferential direction, for example parallel or approximately parallel to the Z axis, and a maximum value along another reference axis which is to be oriented according to another preferential direction, for example parallel or approximately parallel to the X axis. Under these conditions, the resilient joints 5 have, in a manner known per se, reference surfaces or points of reference (not shown) which, on assembly of the said resilient joints in the supports 3, cooperate or are aligned respectively with corresponding reference surfaces or with corresponding points of reference on the supports 3, in such a way that the reference axes along which the resilient joints 5 present their minimal and maximum radial rigidity are correctly oriented relative to the vehicle body 2.

Returning to FIG. 1, it can be seen that each suspension arm 4 bears, on the side of the corresponding resilient joint 5, a shaft 11 and, on the side opposite the said joint, an axle arm 12 designed to receive a wheel 13, more precisely a rear wheel of the vehicle. Each of the two shafts 11, whose axes are aligned with the axis 6 of the resilient joints 5 and with they Y axis, is rigidly fixed, i.e., without any possible relative rotation, to the inner reinforcement 8 of the corresponding resilient joint. For example, fixation of the shaft 11 to the inner reinforcement 8 may be effected by force fit, by adhesive bonding or by any other technique known in this field of technology. In addition, a crosspiece (not shown), which connects the two shafts 11 by a U configuration, or the two arms 4 by an H configuration, may be provided. The crosspiece may have a structure similar to that described in European Patent EP 0,956,984 or in published patent application WO 97/47,486.

Figure 3:
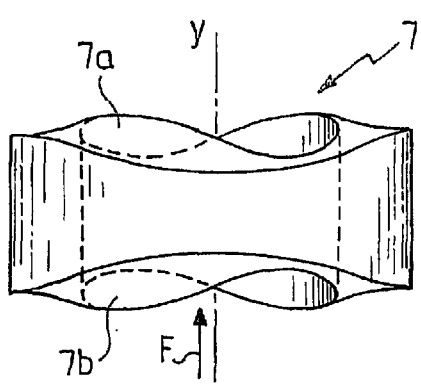
FIG. 3 is a view in elevation, in the free state, of the elastomeric sleeve of the resilient joint of FIG. 2.
Figure 5:
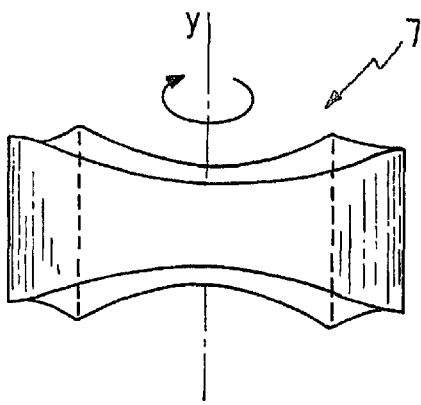
FIG. 5 is a view similar to FIG. 3 and shows the shape of the elastomeric sleeve when it is subjected to a torsional reference load.

As indicated above, each of the two resilient joints 5 is designed to present variable radial rigidity in the circumferential direction, that is, the rigidity of the joint varies as a function of the polar angle of the radial direction about the Y axis. According to the present invention, the variation in radial rigidity is obtained by giving at least one of the two end surfaces 7a and 7b of the elastomeric sleeve 7, preferably its two end surfaces, a profile that moves continuously in the circumferential direction of the sleeve 7 between at least a minimum and at least a maximum. As is visible notably in FIG. 3, the profile may be a wavy profile that has, for example, a sinusoidal or pseudo-sinusoidal shape with two minima and two maximums on the circumference of the sleeve 7.

Figure 4:
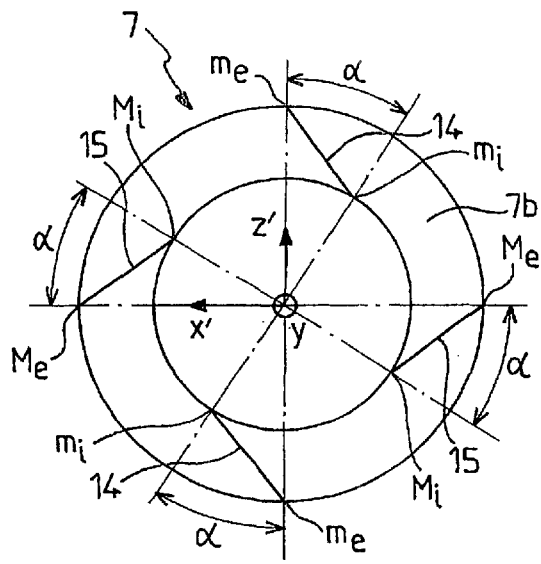
FIG. 4 is a view of the elastomeric sleeve along the arrow F of FIG. 3.
Figure 8:
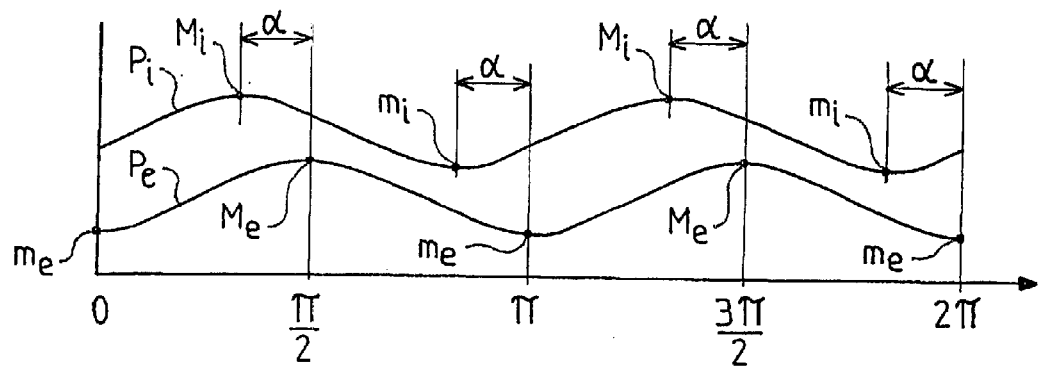
FIG. 8 is a graph showing the wavy profile of one of the end surfaces of the elastomeric sleeve in the inner peripheral zone and in the outer peripheral zone of the said sleeve, when the latter is in the free state.

Since each resilient joint 5 is designed to operate in torsion to support at least part of the load (vehicle body) and provide a suspension spring function, the two minima $m_i$ and the two maximums $M_i$ of the wavy profile $P_i$ in the inner peripheral zone of the end surface 7a or 7b are angularly offset by a predefined angle α respectively relative to the two minima $m_e$ and the two maximums $M_e$ of the wavy profile $P_e$ in the outer peripheral zone of the end surface 7a or 7b when the sleeve 7 is not subject to any load, as shown in FIGS. 4 and 8. Between the minima $m_i$ and $m_e$, the geometric loci 14 of the minima of the wavy profile of the end surface 7a or 7b of the sleeve 7 extend obliquely relative to one radial direction, as shown in FIG. 4. Similarly, between the maximums $M_i$ and $M_e$, the geometric loci 15 of the maximums of the wavy profile of the end surface 7a or 7b extend obliquely relative to another radial direction, as is likewise shown in FIG. 4.

Figure 6:
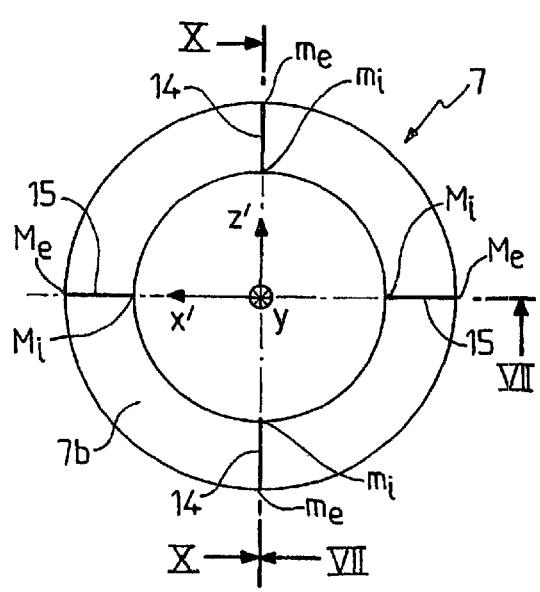
FIG. 6 is a view similar to FIG. 4, the elastomeric sleeve being subjected to the torsional reference load.
Figure 9:
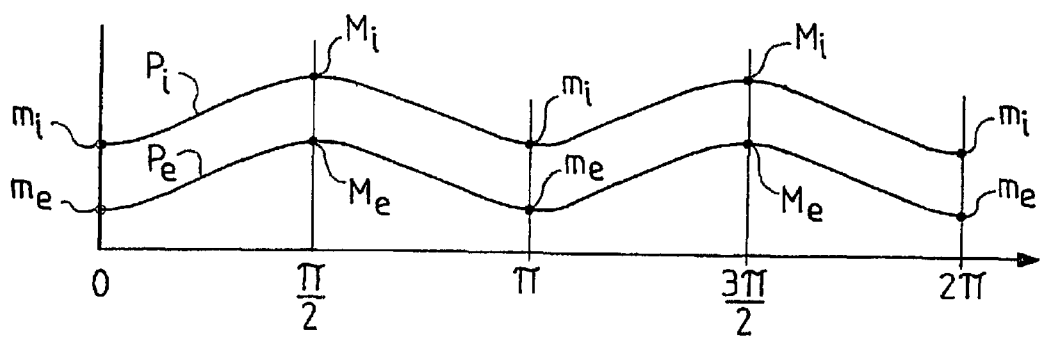
FIG. 9 is a graph showing the wavy profile of the end surface of the elastomeric sleeve in the inner peripheral zone and in the outer peripheral zone of the said sleeve, when the latter is subjected to the torsional reference load.

The value of the predefined angle o is selected so that, when the resilient joint 5 is subjected to a reference load producing a relative rotation of the angle α, for example of the inner reinforcement 8 relative to the outer reinforcement 9, the sleeve 7 undergoes twisting and is deformed in such a way that the minima $m_i$ and the maximums $M_i$ of the wavy profile $P_i$ in the inner peripheral zone of the end surface 7a or 7b are aligned radially respectively with the minima me and the maximums $M_e$ of the wavy profile $P_e$ in the outer peripheral zone of the end surface 7a or 7b, as FIGS. 6 and 9 show. The geometric loci 14 of the minima and the geometric loci 15 of the maximums of the wavy profile on each of the two end surfaces 7a and 7b of the sleeve 7 are then oriented approximately radially respectively along the two reference axes X' and Z' of a system with three reference axes X', Y, Z' linked to each resilient joint 5. The two axes X' and Z' are perpendicular to the Y axis of the two resilient joints 5, which is also designated by the reference 6 in FIG. 1.

The above-mentioned reference load, which determines the value of the angle α as well as a reference position of the vehicle comprising the axle 1 of FIG. 1, equipped with two resilient joints 5 according to the invention, may be defined for example as being the load applied to each of the two wheels 13 of the axle 1 for a vehicle operative in regular use. This reference load will naturally vary from one vehicle model to another and its definition may itself vary from one vehicle manufacturer to another. For example, for a four-wheeled vehicle, the reference load may be defined as being one-quarter of the sum of the empty weight of the vehicle, of the weight of two mannequins weighing 75 kg each, and of a fuel weight corresponding to a fuel tank half full.

Figure 7:
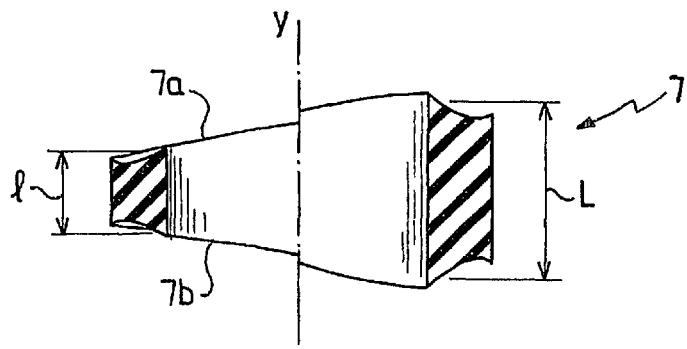
FIG. 7 is a sectional view along the broken line VII—VII of FIG. 6.

With the construction of the resilient joint 5 described above, the axial length of the elastomeric sleeve 7 has a minimal value in correspondence with the geometric loci 14 of the minima of the wavy profile of the two end surfaces 7a and 7b, that is, in the plane defined by the two axes Y and Z', and a maximum value L in correspondence with the geometric loci 15 of the maximums of the wavy profile of the two end surfaces 7a and 7b, that is, in the plane defined by the two axes Y and X', as shown respectively in the left and right-hand halves of FIG. 7. Since the radial rigidity of an elastomeric sleeve is, in first approximation, proportional to the axial length of the sleeve, the resilient joint 5 described above would thus have a minimal radial rigidity along the Z' axis and a maximum radial rigidity along the X' axis when the sleeve is subjected to the reference load.

On assembly of the two resilient joints 5 in the supports 3 of the axle 1, the X' and Z' axes of each joint 5 are oriented, thanks to the reference surfaces and/or to the above-mentioned points of reference of the supports 3 and outer reinforcements 9, so as to be parallel to respectively the X and Z axes of the system of X, Y, Z axes linked to the vehicle body 2. In other words, the X' axis is horizontal and the Z' axis vertical. It is in this position that the performance of the two resilient joints 5 in acoustic filtering turns out to be best. However, it is not absolutely essential that the Z' axis of each joint 5 be oriented absolutely accurately vertically and its orientation may be comprised between the limits of +45° and −45° relative to a perpendicular to the horizontal plane defined by the X and Y axes of the reference system linked to the body of the vehicle. Similarly, it is not absolutely essential that the minima and maximums of the wavy profile of each of the two end surfaces 7a and 7b of the sleeve 7 be angularly equidistant along the circumference.

The resilient joint 5 with variable radial rigidity according to the invention, relative to previously known resilient joints with variable radial rigidity, has better fatigue resistance when the joint operates in compression/traction as well as when it operates in torsion. It may be thought that this is due to the continuous and regular movement of the wavy profile of its two end surfaces 7a and 7b, which, in service, cause the stresses of compression/traction and the stresses of torsion not to be concentrated in the localized zones of the sleeve 7, but allow them to be more easily distributed in the core of the said sleeve, on its entire circumference.

Figure 10:
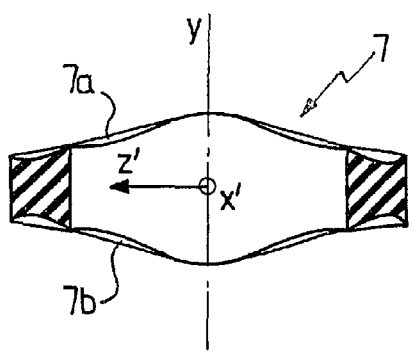
FIG. 10 is a sectional view along line X—X of FIG. 6.
Figure 11:
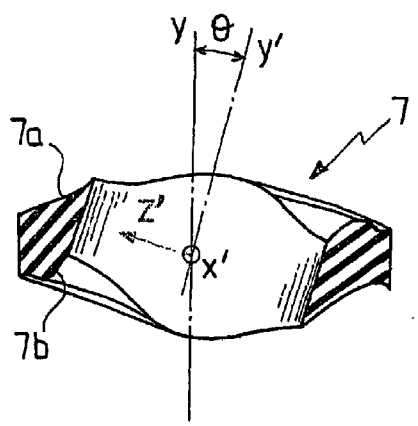
FIG. 11 is a sectional view similar to that of FIG. 10, showing the deformation of the elastomeric sleeve when it is subjected to a conical stress.

Further, the geometry of the elastomeric sleeve 7 described above permits flexing of the resilient joint in conical rigidity about the X' axis. Referring to FIGS. 10 and 11, it can be seen that the section of the sleeve 7 in the plane defined by the Y and Z' axes is deformed when the resilient joint 5 is subjected to conical stress, that is, to stress such that the Y' axis of the inner reinforcement 8 of the resilient joint has turned through an angle θ (FIG. 11) about the X' axis relative to the Y axis of the outer reinforcement 9 of the said joint.

Figure 12:
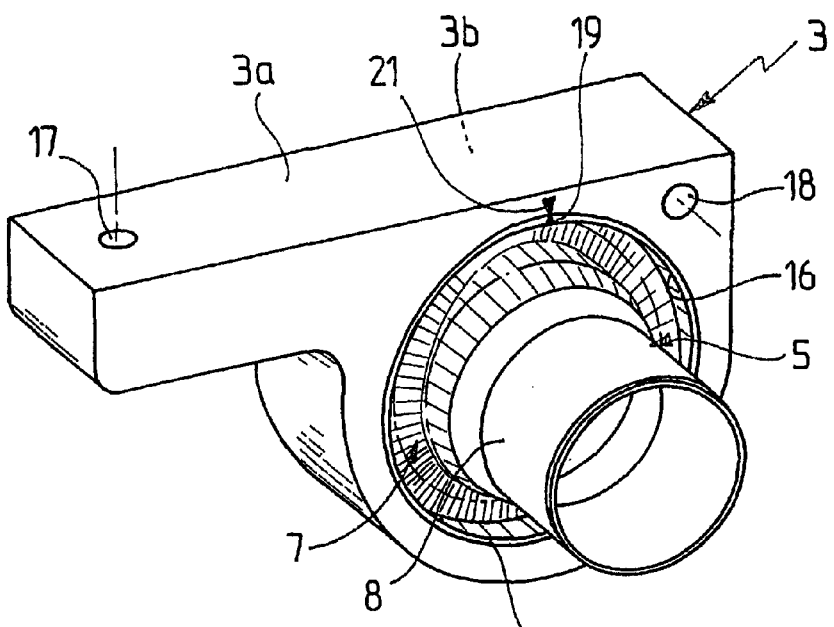
FIG. 12 is a perspective view showing the resilient joint of FIG. 2 installed in the bore of a side rail designed to be fixed to a vehicle body.
Figure 13:
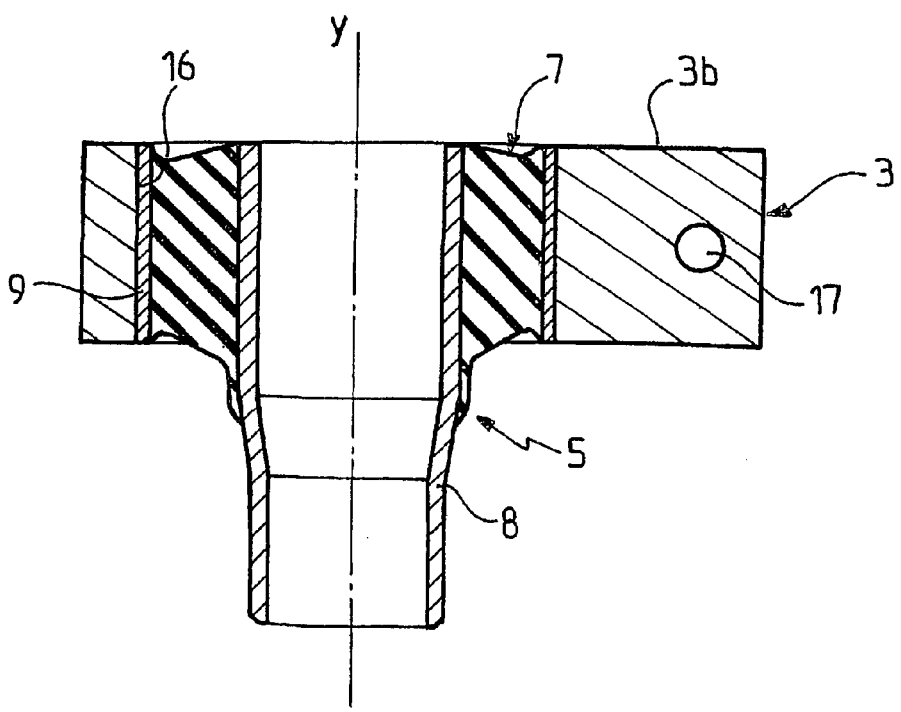
FIG. 13 is a horizontal sectional view of the side rail and of the resilient joint of FIG. 12.

Referring now to FIGS. 12 and 13, one can see an embodiment of a support 3 serving for assembly of one or the other of the two resilient joints 5 of the axle 1 on a vehicle body 2. Here, the support 3 is made up of a side rail, realized for example in the form of an aluminum or aluminum-alloy casting or extruded piece, which has a bore 16 in which the outer reinforcement 9 of the resilient joint 5 is rigidly fixed, for example by force fit or and/or by bonding.

The rail (or longitudinal member) 3 comprises at least one plane supporting surface, preferably two plane supporting surfaces 3a and 3b, which are perpendicular to one another and which are designed to serve as reference surface for assembly of the rail 3 on the vehicle body 2. The plane face 3b is perpendicular to the axis of the bore 16, hence also to the Y axis of the resilient joint 5, and is designed to be applied against a vertical supporting surface of the body 2, which is parallel to the plane defined by the X and Z axes of the reference system linked to the body of the vehicle. The plane supporting surface 3a of the side rail 3 is designed to be applied against another plane supporting surface which is provided on the vehicle body 2 and which is parallel to the horizontal plane defined by the two axes X and Y of the reference system linked to the body of the vehicle.

The side rail 3 additionally comprises two holes 17 and 18 whose axes are perpendicular respectively to the plane supporting surfaces 3a and 3b. The holes 17 and 18 are designed to receive screws or bolts for fixation of the rail 3 on the aforementioned supporting surfaces of the vehicle body.

So that the Z' axis along which the resilient joint 5 presents its minimal radial rigidity can be oriented in the desired direction relative to the vehicle body 2, notably relative to the Z axis of the reference system linked to the vehicle body, the resilient joint 5 may advantageously include a mark 19 designed to be placed in coincidence with a mark 21 borne by the rail 3 (FIG. 12) when the resilient joint 5 is inserted into the bore 16 of the rail 3. The mark 19 may for example be situated at the outer periphery of one of the end surfaces of the sleeve 7 in an angular position corresponding to one of the two minima me (FIG. 6) of the wavy profile.

It goes without saying that the embodiment of the invention that has been described above has been given by way of purely indicative and in no way limitative example, and that numerous modifications may be made by those skilled in the art without exceeding the scope of the invention. Thus, notably, although the elastomeric sleeve 7 has been represented with a longitudinal section which preferably has approximately the shape of a trapezium, the large base of which is situated on the side of the inner reinforcement 8 and the small base on the side of the outer reinforcement 9, and with inner peripheral lips 7c and 7d and outer peripheral lips 7e and 7f on the end surfaces 7a and 7b, as shown notably in FIG. 2, the longitudinal section of the sleeve 7 may, for example, have a rectangular shape.

In addition, the number of minima and the number of maximums of the profile along the circumference of the or of each of the end surfaces of the elastomeric sleeve is not necessarily equal to two. The number may be equal to one or greater than two depending on the number of radial directions along which it is desired that the elastomeric sleeve have respectively minimal radial rigidity and maximum radial rigidity.

Further, although in the representation of FIGS. 8 and 9, the peak-to-peak amplitude of the wave (difference in amplitude between minima and maximums) of the profile $P_i$ in the inner peripheral zone of an outer surface 7a or 7b of the sleeve 7 is equal or approximately equal to the peak-to-peak amplitude of the wave of the profile $P_e$ in the outer peripheral zone of the said end surface 7a or 7b, the two profiles $P_i$ and $P_e$ may have different peak-to-peak amplitudes and, in a marginal case, one of the two profiles $P_i$ and $P_e$ may have zero or almost zero peak-to-peak amplitude.

Moreover, for obtaining variable radial rigidity, the profile of the end surface or surfaces of the sleeve, which moves continuously in the circumferential direction of the sleeve, may be combined with a continuous variation in the radial thickness of the said sleeve along the circumference of the latter, so that the cross section of at least one of the reinforcements 8 and 9 is not necessarily circular, but may for example have an elliptical or oval shape.

I claim:

1. A resilient joint with variable radial rigidity, designed to operate in compression/traction and in torsion at the same time, in particular for a vehicle suspension, comprising an inner reinforcement, an outer reinforcement surrounding the inner reinforcement, and a sleeve made of elastomeric material, which is arranged between the inner and outer reinforcements and whose inner and outer peripheral surfaces are linked without any possibility of sliding to the said inner and outer reinforcements, the said sleeve being formed in such a way that the joint has a minimal radial rigidity along a first reference axis Z' of a system with three reference axes X', Y, Z', whose second reference axis Y merges with the axis of rotation of the resilient joint, characterized in that at least one of the two end surfaces of the sleeve has a profile that moves continuously in the circumferential direction of the sleeve between at least a minimum and at least a maximum, and in that the profile $P_i$, in the inner peripheral zone of the said end surface, has at least a minimum $m_i$ and at least a maximum $M_i$ which are offset by a predefined angle $\alpha$ respectively relative to at least a minimum $m_e$ and at least a maximum $M_e$ of the profile $P_e$ in the outer peripheral zone of the said end surface when no load is applied to the joint.

2. The resilient joint according to claim 1, wherein the said predefined angle $\alpha$ is selected in such a way that, when the joint is subjected to a reference load producing a relative rotation of the said predefined angle of the inner and outer reinforcements relative to one another, the geometric loci of the minima and the geometric loci of the maximums of the profile between the said inner and outer peripheral zones are oriented approximately radially respectively along the first reference axis Z' and a third reference axis X' of the system with three reference axes.

3. The resilient joint according to claim 2, wherein in each of the inner and outer peripheral zones and in the intermediate zones, the said profile $P_i$, $P_e$ has two minima and two maximums along the circumference of the sleeve of elastomeric material.

4. The resilient joint according to claim 3, wherein the two end surfaces of the sleeve have a wavy profile.

5. The resilient joint according to claim 4, wherein the wavy profile has an approximately sinusoidal or pseudo-sinusoidal shape.

6. The resilient joint according to claim 5, wherein the first reference axis Z' is approximately perpendicular to a horizontal plane linked to the vehicle body.

7. The resilient joint according to claim 6, wherein the outer reinforcement is made up of a cylindrical collar or sleeve that is rigidly fixed in a predefined angular position in a bore of a supporting piece designed to be fixed to the vehicle body.

8. The resilient joint according to claim 7, wherein the supporting piece is a side rail, which has at least one supporting surface, preferably two supporting surfaces, capable of cooperating with at least one corresponding supporting surface on the vehicle body, so that, after fixation of the rail to the said body, the three reference axes X', Y, Z' of the resilient joint have predefined orientations relative to a system of reference axes X, Y, Z linked to the vehicle body.

9. A vehicle suspension comprising two resilient bearing joints operating in torsion, wherein each resilient joint is a joint according to any one of claims 1, 2, 3, 4, 5, 6, 7 or 8.

* * * * *

UNITED STATES PATENT AND TRADEMARK OFFICE
CERTIFICATE OF CORRECTION

PATENT NO.     : 6,575,441 B2
DATED          : June 10, 2003
INVENTOR(S)    : Lefebvre It is certified that error appears in the above-identified patent and that said Letters Patent is hereby corrected as shown below:

Column 5,
Line 5, "o" should read -- $\alpha$ --
Line 11, "me" should read -- $m_e$ --

Column 8,
Line 24, "$P_c$" should read -- $P_e$ --

Signed and Sealed this

Eleventh Day of November, 2003

JAMES E. ROGAN
*Director of the United States Patent and Trademark Office*